United States Patent
Hocker et al.

(10) Patent No.: US 10,110,481 B2
(45) Date of Patent: Oct. 23, 2018

(54) VIRTUAL NETWORK FUNCTIONS WITH HIGH AVAILABILITY IN PUBLIC CLOUDS

(71) Applicant: Cisco Technology, Inc., San Jose, CA (US)

(72) Inventors: Christopher Mark Hocker, Arlington, VA (US); Bopaiah Ponnappa Puliyanda, Union City, CA (US); Esteban Raul Torres, Danville, CA (US); Sanjeev P. Tondale, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 4 days.

(21) Appl. No.: 14/716,853

(22) Filed: May 19, 2015

(65) Prior Publication Data

US 2016/0344628 A1  Nov. 24, 2016

(51) Int. Cl.
| | | |
|---|---|---|
| *H04L 12/28* | (2006.01) | |
| *H04L 12/713* | (2013.01) | |
| *H04L 12/751* | (2013.01) | |
| *H04L 12/46* | (2006.01) | |
| *H04L 29/08* | (2006.01) | |

(52) U.S. Cl.
CPC ........ *H04L 45/586* (2013.01); *H04L 12/4616* (2013.01); *H04L 12/4633* (2013.01); *H04L 45/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,751,191 B1 | 6/2004 | Kanekar et al. | |
| 6,982,984 B1 | 1/2006 | Asayesh et al. | |
| 8,861,341 B2 | 10/2014 | Richardson | |
| 8,938,611 B1* | 1/2015 | Zhu | H04L 49/70 713/153 |
| 9,100,274 B1* | 8/2015 | Ghosh | H04L 45/586 |
| 2002/0178398 A1* | 11/2002 | Sekiguchi | H04L 1/22 714/4.3 |
| 2006/0250951 A1* | 11/2006 | Ueda | H04L 45/00 370/217 |
| 2008/0101350 A1* | 5/2008 | Kreuk | H04L 12/4641 370/389 |

(Continued)

OTHER PUBLICATIONS

Hewlett-Packard Development Company, LP, "HP VSR1000 Series Technical Overview", Version 1.6, Mar. 2014, 26 pages.

*Primary Examiner* — Otis L Thompson, Jr.
(74) *Attorney, Agent, or Firm* — Fernando & Partners, LLP; Prateek Bhatnagar

(57) ABSTRACT

Various implementations disclosed herein include apparatuses, systems, and methods for providing virtual/virtualized network functions. In some implementations, a method includes determining that a first virtual router is configured to operate as a backup router for a second virtual router. The first virtual router and the second virtual router may reside within a public cloud. The method also includes determining, by the first virtual router, whether the second virtual router is able to route packets. The method further includes updating, by the first virtual router, a routing table to indicate that the first virtual router should be used to route packets when the second virtual router is unable to route packets.

12 Claims, 8 Drawing Sheets

(56) References Cited

U.S. PATENT DOCUMENTS

| | | | | |
|---|---|---|---|---|
| 2008/0301256 A1* | 12/2008 | McWilliams | ....... | G06F 12/0284 709/214 |
| 2009/0182894 A1* | 7/2009 | Vasseur | ................... | H04L 45/02 709/239 |
| 2010/0182926 A1* | 7/2010 | Kubota | ................... | H04L 45/28 370/252 |
| 2010/0257263 A1 | 10/2010 | Casado et al. | | |
| 2011/0191624 A1* | 8/2011 | Rodgers | ................. | G06F 15/16 714/4.11 |
| 2011/0255539 A1* | 10/2011 | Yumoto | .................. | H04L 45/00 370/392 |
| 2012/0182862 A1* | 7/2012 | Cirkovic | ............. | H04L 41/0654 370/220 |
| 2013/0103834 A1* | 4/2013 | Dzerve | .................. | H04L 67/10 709/225 |
| 2015/0063364 A1* | 3/2015 | Thakkar | .................. | H04L 12/66 370/401 |
| 2015/0309894 A1* | 10/2015 | Zhou | ................... | G06F 11/2023 714/4.11 |
| 2016/0191304 A1* | 6/2016 | Muller | ................ | H04L 41/0668 370/220 |
| 2016/0198003 A1* | 7/2016 | Luft | ...................... | H04L 67/141 709/225 |
| 2017/0142012 A1* | 5/2017 | Thakkar | .............. | H04L 45/7453 |

* cited by examiner

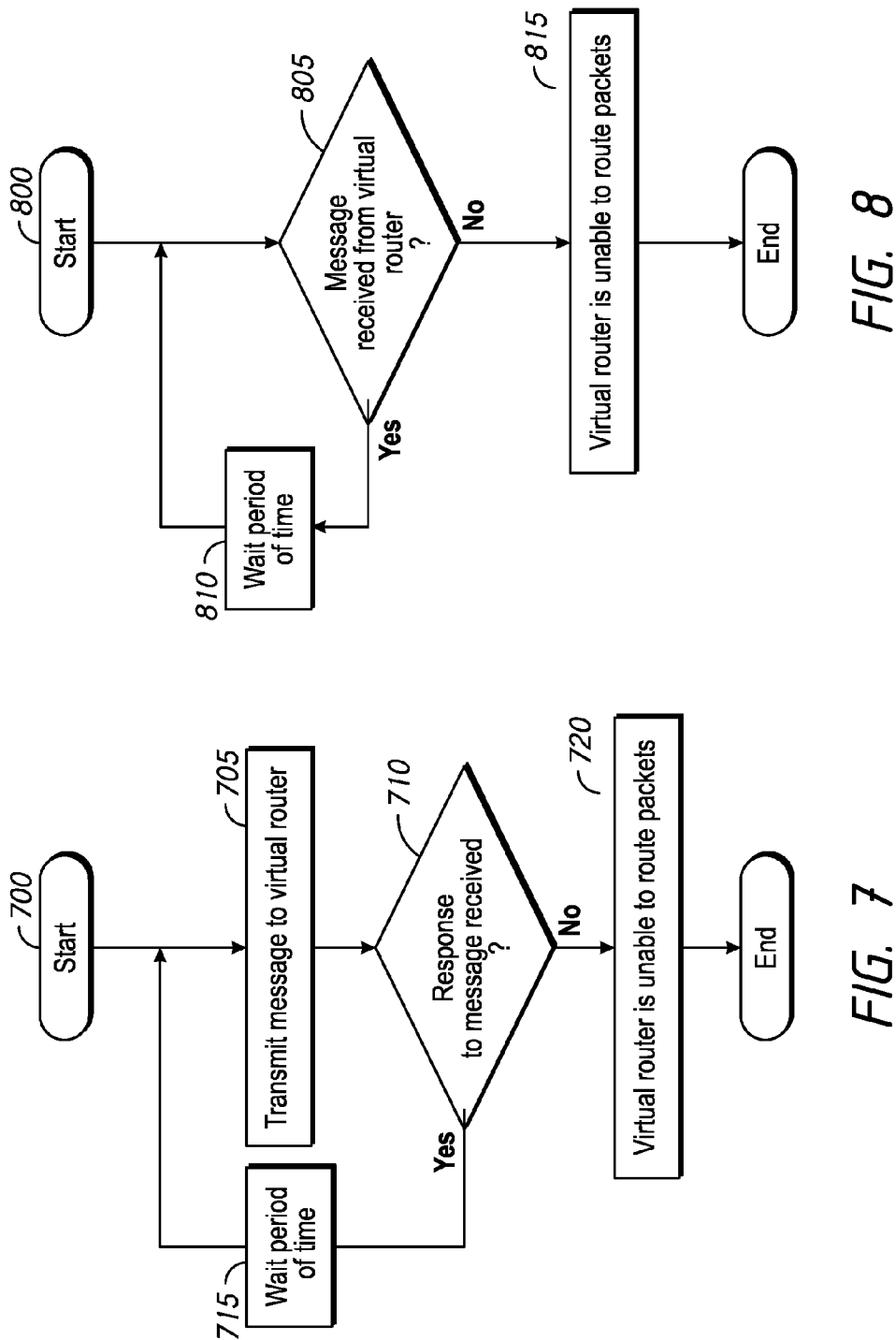

VIRTUAL NETWORK FUNCTIONS WITH HIGH AVAILABILITY IN PUBLIC CLOUDS

FIELD OF THE INVENTION

The present disclosure relates to network functions (or services). More specifically, the present disclosures relates to virtual/virtualized network functions (or services) with high availability.

BACKGROUND

Computer networks may include various network devices (e.g., routers, switches) and/or network functions to meet the varying needs of users. Users may also wish to have the network devices and/or network functions operate with high availability. High availability may refer to refer to a system, component, and/or function that may be continuously operational for extended periods of time. High availability may allow the network devices and/or network functions to operate with more reliability and may reduce the impact of failures of the network devices and/or network functions.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

FIG. 7 is a flowchart representation of a method of determining whether a virtual router is able to route packets, in accordance with some embodiments.

FIG. 8 is a flowchart representation of a method of determining whether a virtual router is able to route packets, in accordance with some embodiments.

Figure 1:
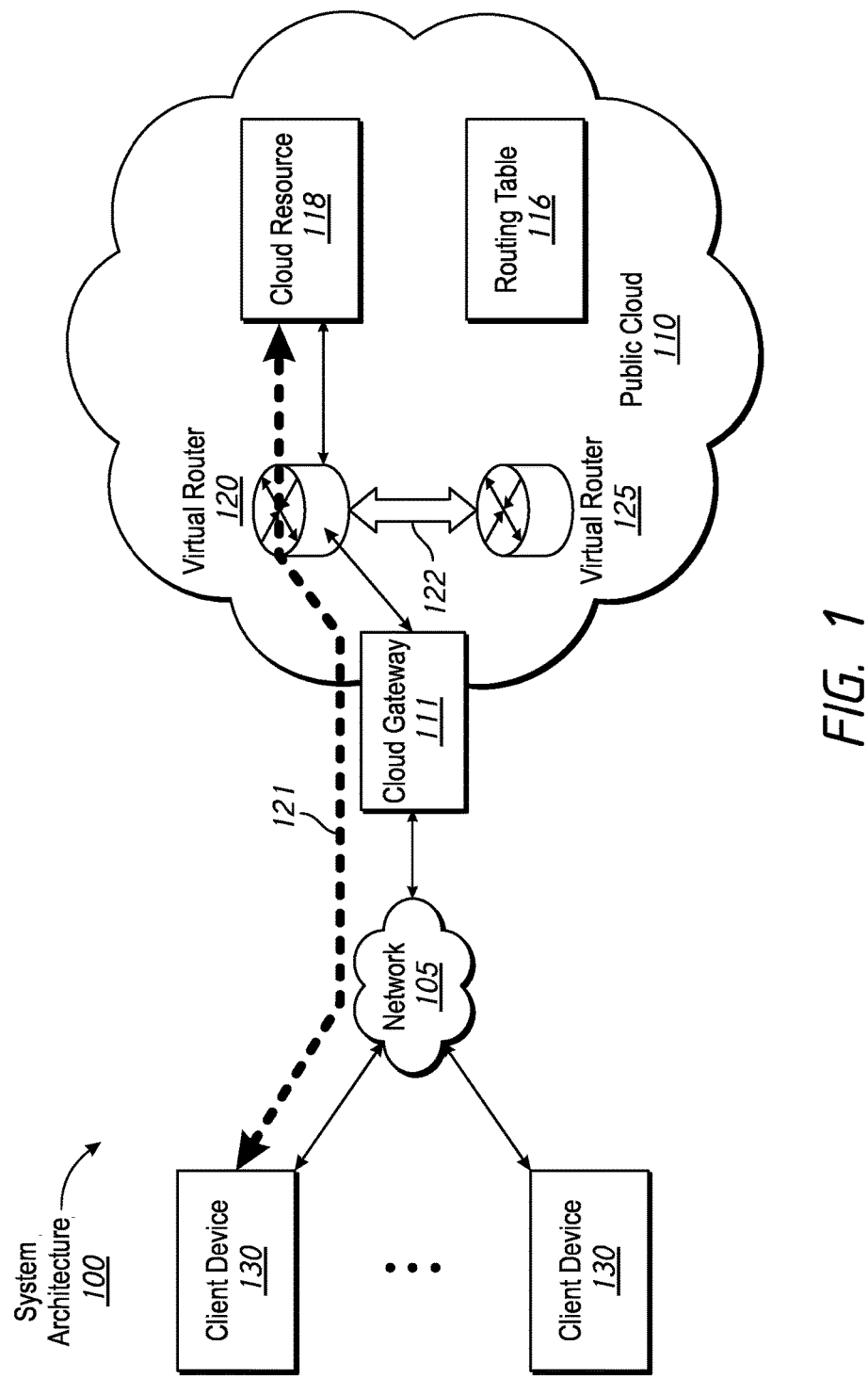
FIG. 1 is a block diagram illustrating a system architecture, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for providing virtual/virtualized network functions with high availability. For example, in some implementations, a method includes determining that a first virtual router is configured to operate as a backup router for a second virtual router. The first virtual router and the second virtual router may reside within a public cloud. The method also includes determining, by the first virtual router, whether the second virtual router is able to route packets. The method further includes updating, by the first virtual router, a routing table to indicate that the first virtual router should be used to route packets when the second virtual router is unable to route packets.

DETAILED DESCRIPTION

As discussed above, users may wish to have network devices and/or network functions operate with high availability. The network devices and/or network functions may use Layer 2 (L2) protocols, functions, features, and/or services to achieve high availability. However, virtualized network devices and/or virtualized network functions may not have access to L2 protocols, functions, features, and/or services (as discussed below). In some example embodiments, virtualized network devices and/or virtualized network functions may operate with high availability even though the virtualized network devices and/or virtualized network functions may not have access to L2 protocols, functions, features, and/or services.

FIG. 1 is a block diagram illustrating a system architecture 100, in accordance with some embodiments. The system architecture includes client devices 130, a network 105, a public cloud 110, and a cloud gateway 111. The client devices 130 may be computing devices (such as a rack-mount server, a server computer, a personal computer, a mainframe computer, a smartphone, a personal digital assistant (PDA), a laptop computer, a tablet computer, a desktop computer, etc.). The network 105 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. The client devices 130 may communicate data (e.g., transmit and/or receive data, such as messages, packets, etc.) with the public cloud 110 via the network 105.

The public cloud 110 may be a collection resources that are operated by a cloud service provider. For example, the public cloud 110 may include one or more of infrastructure resources (e.g., server computers, data storage, etc.), computing resources (e.g., mainframe computers, server computers, etc.), network resources (e.g., routers, switches, etc.), and software resources (e.g., applications, services, web services, etc.). The different resources of the public cloud 110 may be combined to form the cloud resource 118. For example, the cloud resource 118 may be a web service (e.g., a software resource) that is operating (e.g., executing) on one or more computing devices (e.g., infrastructure resources) of the public cloud 110. In another example, the cloud resource 118 may be subnet of an internet protocol (IP) network (e.g., a logical division of the IP network) that uses network resources (e.g., routers, switches, etc.) of the public cloud 110.

The network 105 may be communicatively coupled to the cloud gateway 111. The cloud gateway 111 may be one or more computing devices, network devices (e.g., routers, switches, etc.), and/or networks that may be used to access the resources of the public cloud 110 (e.g., cloud resource 118). For example, the cloud gate 111 may be a point of access (e.g., an access point) to reach the cloud resource 118. The cloud gateway 111 may control access to the public cloud 110 (e.g., may authorize users or client devices 130). The cloud gateway 111 may also operate as a firewall to prevent certain types of messages, packets, or data from reaching the public cloud 110.

Network Functions Virtualization (NFV) is a network architecture framework/concept that may use virtualization related technologies to virtualize classes of network functions into building blocks. For example, routing functions (e.g., a class of network functions that routes packets/data) may generally be performed by a router (e.g., a physical/hardware device). NFV may virtualize routing functions into one or more building blocks. These building blocks (e.g., classes of network node functions) may be connected and/or chained to create various network services. For example, the building blocks may be combined to create a load balancing service, a firewall service, a network intrusion detection service, a routing service, etc. NFV may use various virtualization techniques to virtualize network functions. For example, NFV may use one or more virtual machines (VMs) to virtualize network functions. The VMs may use different software, services, and/or processes to perform the network functions. The VMs may operate on server computers (e.g., blade servers) and/or data storage devices (e.g., hard disk, solid state disk, etc.). Because the public cloud 110 includes various resources that may be used to perform various functions and/or operations, the resources of the public cloud 110 (e.g., computing resources such as server computers, storage resources, etc.) may be used to virtualize network functions. For example, the computing resources (e.g., server computers) of the public cloud 110 may be used to operate (e.g., execute) VMs that may be used to virtualize network functions.

One class of network functions may be routing functions. Routers may be used to perform routing functions. A router may generally include multiple network interfaces/ports. The router may receive data (e.g., a message, a packet, etc.) on a first network interface/port and may transmit the data on a second network interface/port (e.g., may forward or route data to the second network interface/port). Routers may be chained and/or connected together to route/forward data between a first endpoint (e.g., a computing device, an application, a service, a network, etc.) and a second endpoint. Routers may also be configured to operate with high availability. High availability may refer to refer to a system, component, service, or function that may be continuously operational for extended periods of time. For example, a system or component that may operate (e.g., may be available to perform a function or service) for 99.999% of the time may be referred to as highly available. When routers are configured to operate with high availability, routers may be grouped together to provide high availability for the routing services performed by the routers. For example, two (or more) routers may be grouped together to provide routing services (e.g., to route data) between two endpoints. A first router in a group of routers may be a primary router that is generally responsible for providing the routing services. A second router (or additional routers) in the group of routers operates as a redundant router to provide high availability. For example, the second router (or additional routers) may be configured to operate as a backup router for the first router. When the first router is unable to route data (e.g., when the first router fails or becomes inoperative), the second router may take over the routing services provided by the first router such that the routing services are minimally interrupted. The routers may use various protocols to operate with high availability. For example, routers may use the hot standby router protocol (HSRP) to operate with high availability. The routers may also use various layer 2 (L2) protocols, functions, features, and/or services to operate with high availability. For example, the second (e.g., redundant) router in the group of routers may use L2 discovery to determine whether the first router is able to route packets (e.g., whether the first router is operational). Users of the routers may not notice that a primary router has failed and that a secondary router has taken over the functions/operations of the primary router. Thus, the fail-over (e.g., the transition between the primary router and the secondary router) may be seamless or near-seamless.

In one embodiment, NFV may be used to virtualize routing functions such that the routing functions may be located within the public cloud 110. Virtualizing the routing functions within the public cloud 110 may allow for a reduction in capital expenditures and/or operating expenditures. For example, capital expenditures may be reduced because physical/hardware routers may not be used to perform routing functions. In another example, operating expenditures may be reduced because management and/or maintenance of the routing functions may be cheaper, quicker, and/or more efficient, due to the virtualization of the routing functions. The routing functions (that may generally be performed by a router) may be virtualized into virtual routers, such as virtual routers 120 and 125.

The public cloud 110 includes a routing table 116. In one embodiment, the routing table 116 may include data, fields, values, etc., to indicate that the cloud gateway 111 should forward data received from client device 130 to the virtual router 120 and that the virtual router 120 may route (e.g., forward) the data to the cloud resource 118. For example, a client device 130 may transmit data to the public cloud via the network 105 (as illustrated by line 121). The cloud gateway 111 may receive the data from the client device and 130 may access the routing table 116 to determine where to route (e.g., forward the data). The cloud gateway 111 may provide (e.g., transmit) the data to the virtual router 120 based on the routing table 116 (as illustrated by line 121) when the virtual router 120 is able to route packets (e.g., when the virtual router 120 is operational). The virtual router 120 may receive the data from the cloud gateway 111 and may forward/route the data towards the cloud resource 118 (as illustrated by line 121). In one embodiment, the virtual router 120 and the virtual router 125 may be VMs operating (e.g., executing) within the public cloud 110 using resources of the public cloud 110 (e.g., computing resources such as server computers). For example, the virtual routers 120 and the virtual router 125 may each operate in conjunction with a hypervisor of a computing device (as discussed in more detail below).

Although routing functions may be virtualized into virtual routers, it may be desirable to operate to operate the virtual routers with high availability. For example, if virtual router 120 is unable to route packets, it may be desirable for virtual router 125 to take over the routing functions/services of the virtual router 120 to provide high availability. As discussed above, physical/hardware routers may be configured to operate with high availability. The physical/hardware routers may use L2 protocols, functions, features, and/or services to determine when a router is no longer able to route data (e.g., when a router is no longer functioning or operational). However, virtual routers may not have access to L2 protocols, functions, features, and/or services when operating within the public cloud 110. For example, the cloud service provider that operates and/or maintains the public cloud 110 may abstract L2, thus the L2 protocols, functions, features, and/or services may not exist between the virtual router 120 and the virtual router 125. In another example, the cloud service provider that operates and/or maintains the public cloud 110 may not provide users of the public cloud 110 with access to L2 protocols, functions, features, and/or services. Thus, general virtual routers may not be able to operate with high availability because general virtual routers may be unable to access L2 protocols, functions, features, and/or services to determine if a primary router has failed.

In one embodiment, virtual routers 120 and 125 may operate with high availability within the public cloud 110. The virtual routers 120 and 125 may operate with high availability even though the virtual routers 120 and 125 may not have access to L2 protocols, functions, features, and/or services (e.g., L2 discovery may not be available). The virtual router 120 and/or virtual router 125 may determine that the virtual router 125 is to operate as a backup virtual router (e.g., a backup router) for virtual router 120. For example, the virtual router 120 and/or the virtual router 125 may receive configuration data indicating that the virtual router 125 is a backup virtual router for the virtual router 120. Thus, the virtual router 120 may be a primary (virtual) router and the virtual router 125 may be a secondary or backup (virtual) router. In one embodiment, a data tunnel 122 may be established between the virtual router 120 and the virtual router 125 when the virtual router 120 and the virtual router 125 are configured to operate with high availability. The virtual router 120 may establish the data tunnel with the virtual router 125 or vice versa. In one embodiment, the data tunnel 122 may be a general routing encapsulation (GRE) tunnel. Although the present disclosure may refer to a GRE tunnel, it shall be understood that in other embodiments, other types of data tunnels may be used. For example, an internet protocol security (IPSec) tunnel or a secure shell (SSH) tunnel may be used.

The virtual router 125 may determine (e.g., may periodically determine) whether the virtual router 120 is able to route packets via the data tunnel 122 (as discussed in more detail below). If the virtual router 120 is unable to route packets, the virtual router 125 may update the routing table 116 of the public cloud 110 (as discussed below). For example, the virtual router 125 may update the routing table 116 to indicate that the virtual router 125 should be used to route packets to the cloud resource 118 when the virtual router 120 is unable to route packets (e.g., when the virtual router 120 fails or is inoperative).

In one embodiment, the system architecture 100 may allow virtual routers 120 and 125 to operate with high availability when operating in the public cloud 110 and/or when the virtual routers 120 and 125 do not have access to L2 protocols, functions, features, and/or services (e.g., do not have access to L2 discovery). The data tunnel 122 may allow the virtual router 125 to determine (or detect) that the virtual router 120 is unable to route packets and the virtual router 125 may update the routing table 116 when the virtual router 120 is unable to route packets. This may allow the virtual router 125 to resume (e.g., take over) routing functions of the virtual router 120 (e.g., to provide routing functions with high availability) when the virtual router 120 is unable to route packets.

Although two virtual routers (e.g., virtual router 120 and virtual router 125) are illustrated in FIG. 1, it shall be understood that the embodiments, implementations, and/or examples described herein may be applicable to any number of virtual routers (e.g., five virtual routers, twenty virtual routers, etc.). Furthermore, although the present disclosure may refer to routers and/or virtual routers, it shall be understood that routing functions are merely an example network function that may be used. Other embodiments, may allow other types of virtualized network functions to operate with high availability. For example, the embodiments, implementations, and/or examples described herein may be applicable virtualized switching functions (e.g., virtual switches). In another example, the embodiments, implementations, and/or examples described herein may be applicable to any virtualized network function that may operate with high availability.

Figure 2:
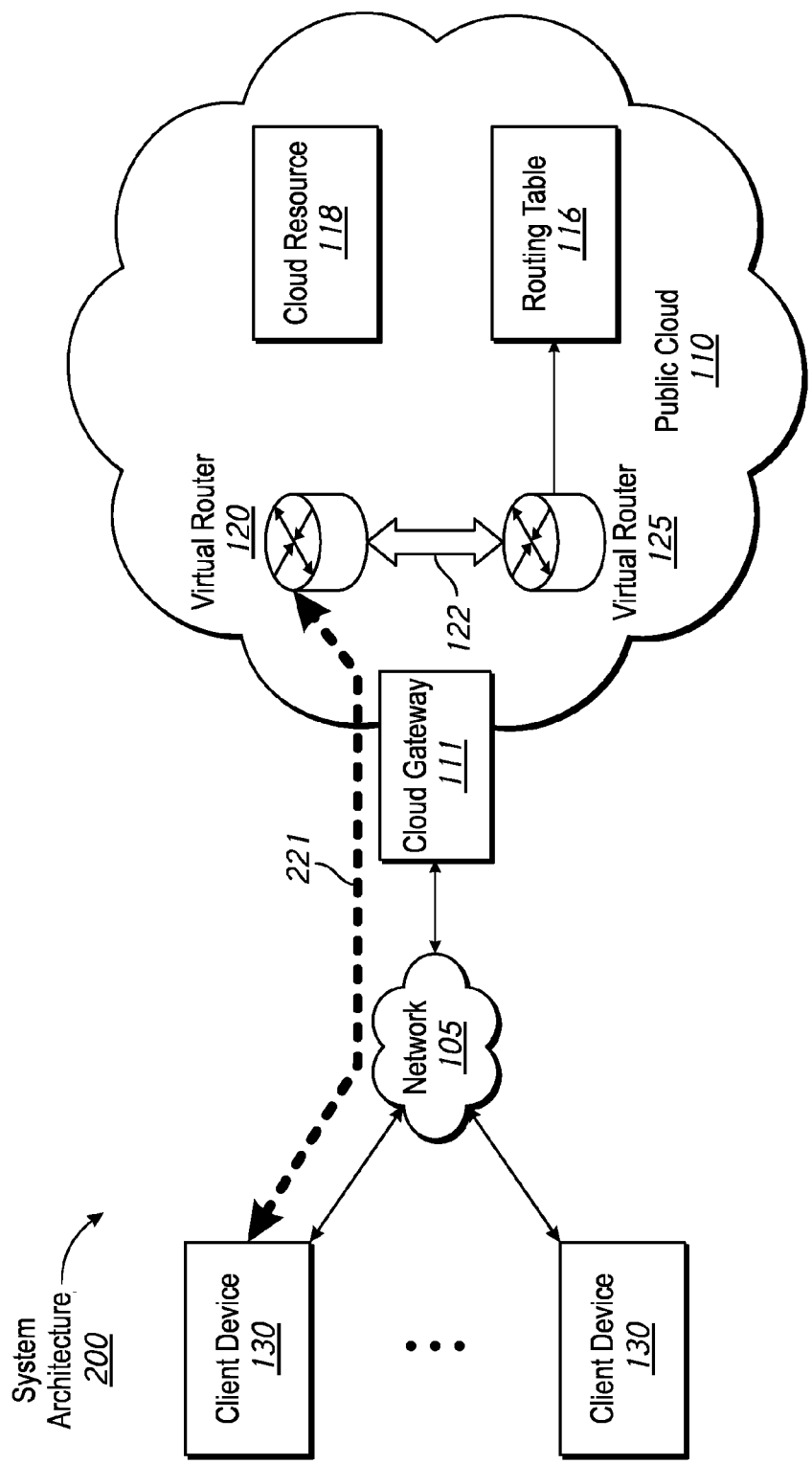
FIG. 2 is a block diagram illustrating a system architecture, in accordance with some embodiments.

FIG. 2 is a block diagram illustrating a system architecture 200, in accordance with some embodiments. The system architecture 200 includes client devices 130, a network 105, a public cloud 110, and a cloud gateway 111. The public cloud 110 includes virtual router 120, virtual router 125, cloud resource 118, and routing table 116. As discussed above, system architecture 200 may use NFV to virtual routing functions into the virtual router 120 and virtual router 125. The virtual router 120 and virtual router 125 may provide routing functions with high availability even though the virtual routers 120 and 125 may not have access to L2 protocols, functions, features, and/or services (e.g., L2 discovery). The virtual router 120 may be a primary (virtual) router and the virtual router 125 may be secondary or backup (virtual) router. Also as discussed above, the virtual router 120 and the virtual router 125 may be VMs operating (e.g., executing) within the public cloud 110 using resources of the public cloud 110 (e.g., computing resources such as server computers).

Referring to FIG. 1, data may be transmitted along the path indicated by line 121 when the virtual router 120 is able to route data (e.g., when the virtual router 120 is operational). As illustrated in FIG. 2, the virtual router 120 may fail or may become inoperative (e.g., may become unable to route data). Data from the client device 130 may not be forwarded to the cloud resource 118 because the virtual router 120 has failed or become inoperative, as indicated by the line 221. As discussed above, data tunnel 122 (e.g., a GRE tunnel) may be established between the virtual router 120 and the virtual router 125. The virtual router 125 may determine (e.g., may periodically determine) whether the virtual router 120 is able to route packets via the data tunnel 122. In one embodiment, the virtual router 120 may be configured to periodically transmit a message, a packet, etc., to the virtual router 125 to indicate that the virtual router 120 is still operational (e.g., is still able to route data). For example, the virtual router 120 may transmit a message to the virtual router 125 via the data tunnel 122 every twenty milliseconds. The virtual router 125 may periodically check to determine whether the messages, packets, etc., are received from the virtual router 120 via the data tunnel 122.

If the virtual router 125 does not receive a threshold number of messages, packets, etc., from the virtual router 120 (e.g., does not receive five consecutive message/packets), the virtual router 125 may determine that the virtual router 120 has failed or is inoperative. In another embodiment, the virtual router 125 may be configured to periodically transmit a message, a packet, etc., to the virtual router 120 via the data tunnel 122 and determine whether a response to the message, packet, etc., is received from the virtual router 120 via the data tunnel 122. For example, the virtual router 125 may transmit a message to the virtual router 120 every ten milliseconds. The virtual router 125 may periodically check to determine whether the responses to the messages, packets, etc., are received from the virtual router 120. If the virtual router 125 does not receive a threshold number of responses from the virtual router 120 (e.g., does not receive three consecutive responses), the virtual router 125 may determine that the virtual router 120 has failed or is inoperative. In other embodiments, the virtual router 125 may use one or more protocols to determine whether the virtual router 120 has failed or is inoperative. For example, the virtual routers 120 and 125 may use the Bidirectional Forwarding Detection (BFD) protocol with the data tunnel 122. In another example, the virtual routers 120 and 125 may use the Enhanced Interior Gateway Routing Protocol (EIGRP) with the data tunnel 122. In a further example, the virtual routers 120 and 125 may use the Border Gateway Protocol (BGP) with the data tunnel 122.

In one embodiment, the virtual router 125 may update the routing table 116 when the virtual router 125 determines that the virtual router 120 is unable to route packets (e.g., the virtual router 120 has failed or is inoperative). The virtual router 125 may update the routing table 116 to indicate that the virtual router 125 should be used to route packets to the cloud resource 118 (instead of the virtual router 120) when the virtual router 120 is unable to route packets. In one embodiment, the virtual router 125 may access one or more application programming inter faces (APIs) to update the routing table 116. The one or more APIs may be provided by the cloud service provider that operates the public cloud 110 to allow updates to the routing table 116. The one or more APIs may be stored in the virtual router 125 (as discussed in more detail below). In another embodiment, the virtual router 125 may transmit a request to another computing device, service, application, etc., within the public cloud 110 to request that the routing table 116 be updated (as discussed in more detail below).

Figure 3:
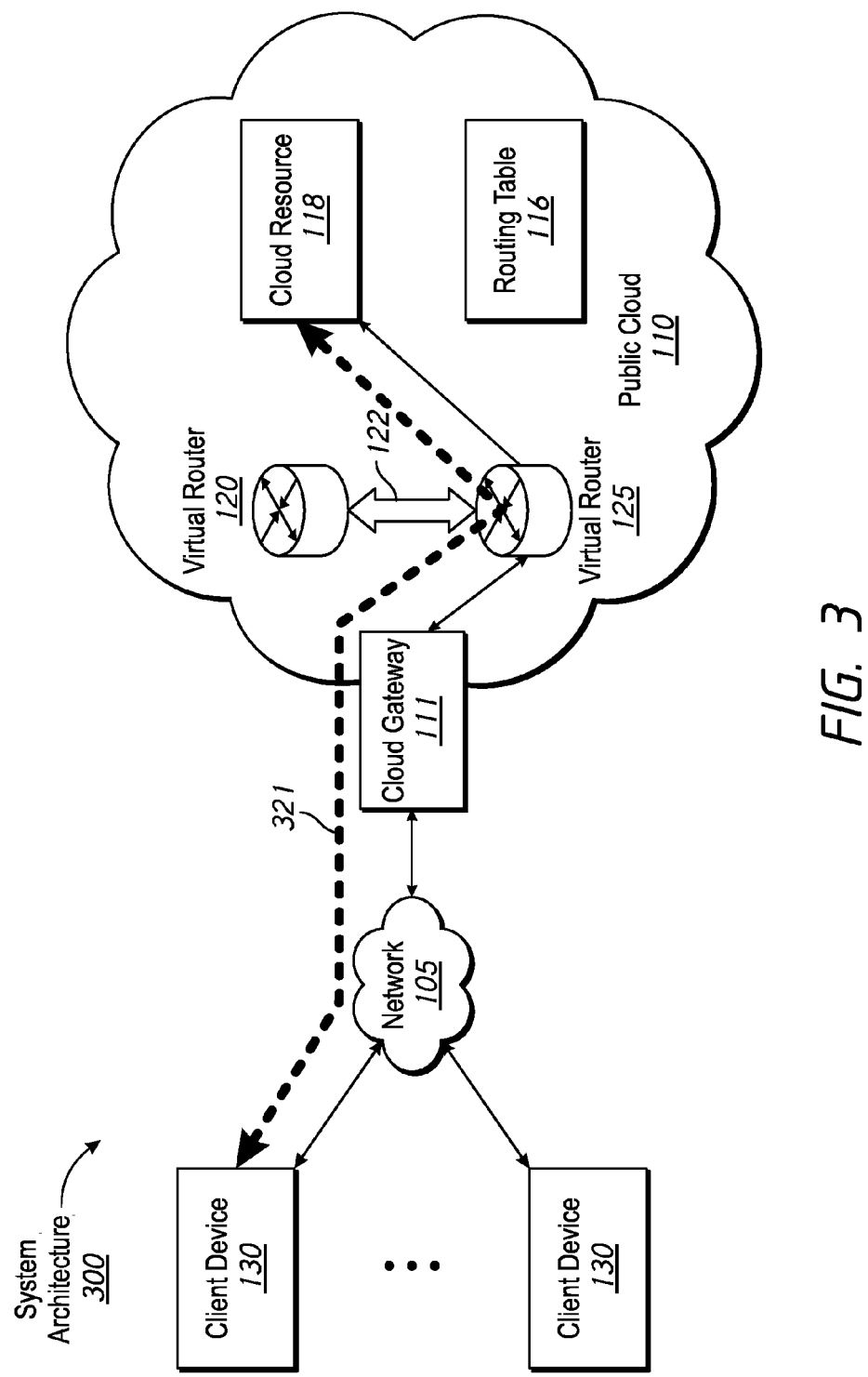
FIG. 3 is a block diagram illustrating a system architecture, in accordance with some embodiments.

FIG. 3 is a block diagram illustrating a system architecture 300, in accordance with some embodiments. The system architecture 300 includes client devices 130, a network 105, a public cloud 110, and a cloud gateway 111. The public cloud 110 includes virtual router 120, virtual router 125, cloud resource 118, and routing table 116. As discussed above, system architecture 300 may use NFV to virtual routing functions into the virtual router 120 and virtual router 125. The virtual router 120 and virtual router 125 may provide routing functions with high availability even though the virtual routers 120 and 125 may not have access to L2 protocols, functions, features, and/or services (e.g., L2 discovery). The virtual router 120 may be a primary (virtual) router and the virtual router 125 may be secondary or backup (virtual) router. Also as discussed above, the virtual router 120 and the virtual router 125 may be VMs operating (e.g., executing) within the public cloud 110 using resources of the public cloud 110 (e.g., computing resources such as server computers).

Referring to FIG. 2, the virtual router 120 may fail or may become inoperative (e.g., may become unable to route data) and data may not be transmitted between the client device 130 and the cloud resource 118 as indicated by the line 221. The virtual router 125 may determine that the virtual router 120 has failed or become inoperative (using data tunnel 122) and may update the routing table 116 to indicate that the virtual router 125 should be used to route packets to the cloud resource 118. As illustrated by line 321, the cloud gateway 111 may route (e.g., forward) data received from the client device 130 to the virtual router 125 after the routing table 116 has been updated. The virtual router 125 may route the data to the cloud resource 118. The detection of the failure of the virtual router 120 and the update of the routing table 116 allows the virtual routers 120 and 125 to provide routing functions (e.g., to route data between the cloud gateway 111 and the cloud resource 118) with high availability.

In one embodiment, the virtual router 125 may become a primary (virtual) router after updating the routing table 116. When the virtual router 125 becomes the primary (virtual) router, the virtual router 125 may periodically determine whether the virtual router 120 becomes operational at a later time. For example, the virtual router 125 may periodically determine whether the virtual router 120 has rebooted or restarted after a crash or failure. The virtual router 125 may periodically transmit messages, packets, etc., to the virtual router 120 and may determine whether responses to the messages, packets, etc., are received from the virtual router 120. If one or more responses are received from the virtual router 120, the virtual router 125 may determine that the virtual router 120 is able to route packets again (e.g., the virtual router 120 is functioning or operational again).

In one embodiment, the virtual router 125 may remain the primary (virtual) router after the virtual router 120 becomes operational. The virtual router 125 may indicate to the virtual router 120 that the virtual router 120 should operate as a secondary or backup (virtual) router. For example, the virtual router 125 may transmit a message to the virtual router 120 or may update configuration settings of the virtual router 120. The data tunnel 122 may be re-established between the virtual router 120 and virtual router 125 and the virtual router 120 may monitor the virtual router 125 to determine whether the virtual router 125 is able to route packets (as discussed above).

In another embodiment, the virtual router 125 may not remain the primary (virtual) router after the virtual router 120 becomes operational. If virtual router 120 becomes operational (e.g., is able to route packets again), the routing table 116 may be updated to indicate that the virtual router 120 should be used to route data between the cloud gateway 111 and the cloud resource 118. For example, the virtual router 120 may update the routing table 116 when the virtual router 120 becomes operational after a failure. In another example, the virtual router 125 may update the routing table 116 when the virtual router 125 determines that the virtual router 120 is operational after a failure.

Figure 4:
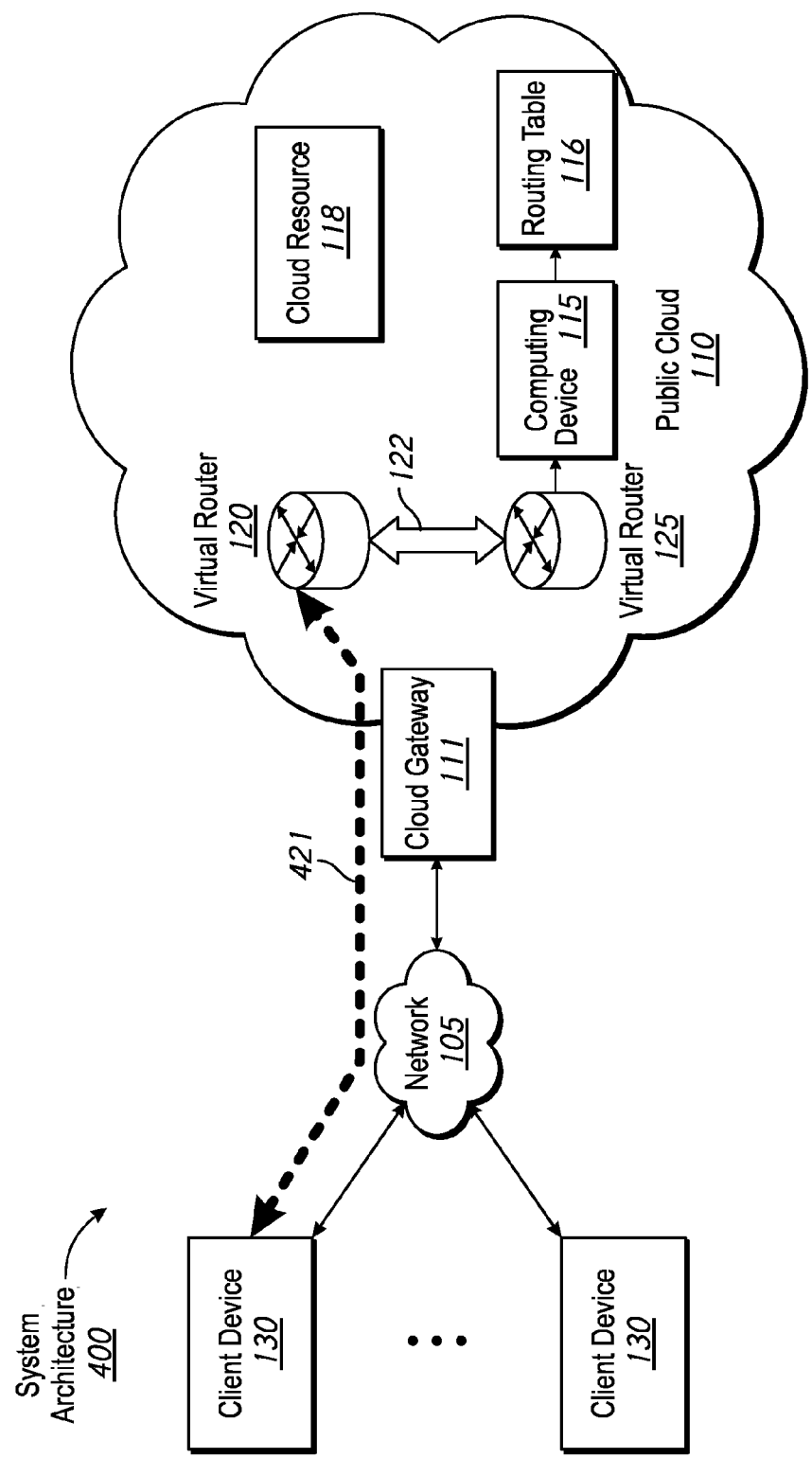
FIG. 4 is a block diagram illustrating a system architecture, in accordance with some embodiments.

FIG. 4 is a block diagram illustrating a system architecture 400, in accordance with some embodiments. The system architecture 400 includes client devices 130, a network 105, a public cloud 110, and a cloud gateway 111. The public cloud 110 includes virtual router 120, virtual router 125, cloud resource 118, and routing table 116. As discussed above, system architecture 400 may use NFV to virtual routing functions into the virtual router 120 and virtual router 125. The virtual router 120 and virtual router 125 may provide routing functions with high availability even though the virtual routers 120 and 125 may not have access to L2 protocols, functions, features, and/or services (e.g., L2 discovery). The virtual router 120 may be a primary (virtual) router and the virtual router 125 may be secondary or backup (virtual) router. Also as discussed above, the virtual router 120 and the virtual router 125 may be VMs operating (e.g., executing) within the public cloud 110 using resources of the public cloud 110 (e.g., computing resources such as server computers).

Referring to FIG. 1, data may be transmitted along the path indicated by line 121 when the virtual router 120 is able to route data (e.g., when the virtual router 120 is operational). As illustrated in FIG. 4, the virtual router 120 may fail or may become inoperative (e.g., may become unable to route data). Data from the client device 130 may not be forwarded to the cloud resource 118 because the virtual router 120 has failed or become inoperative, as indicated by the line 421. As discussed above, data tunnel 122 (e.g., a GRE tunnel) may be established between the virtual router 120 and the virtual router 125. The virtual router 125 may determine that the virtual router 120 is unable to route packets (e.g., has failed or become inoperative) via the data tunnel 122. In one embodiment, the virtual router 125 may not include one or more APIs that may be used to update the routing table 116. The virtual router 125 may transmit a request (e.g., a message, a packet, other data, etc.) to update the routing table 116 to a computing device 115 in the public cloud 110. The request may indicate that the virtual router 125 wants the computing device 115 to update the routing table 116 to indicate that the virtual router 125 should be used to route packets to the cloud resource 118. The computing device 115 may use one or more APIs provided by the cloud service provider to update the routing table 116. In one embodiment, the computing device 115 may be a VM. Although a computing device 115 is illustrated in FIG. 4, it shall be understood that in other embodiments, the cloud service provider (that operates public cloud 110) may provide other components (e.g., an application, a service, etc.) to allow updates to the routing table 116. In one embodiment, the computing device 115 may also be provided by the cloud service provider.

Figure 5:
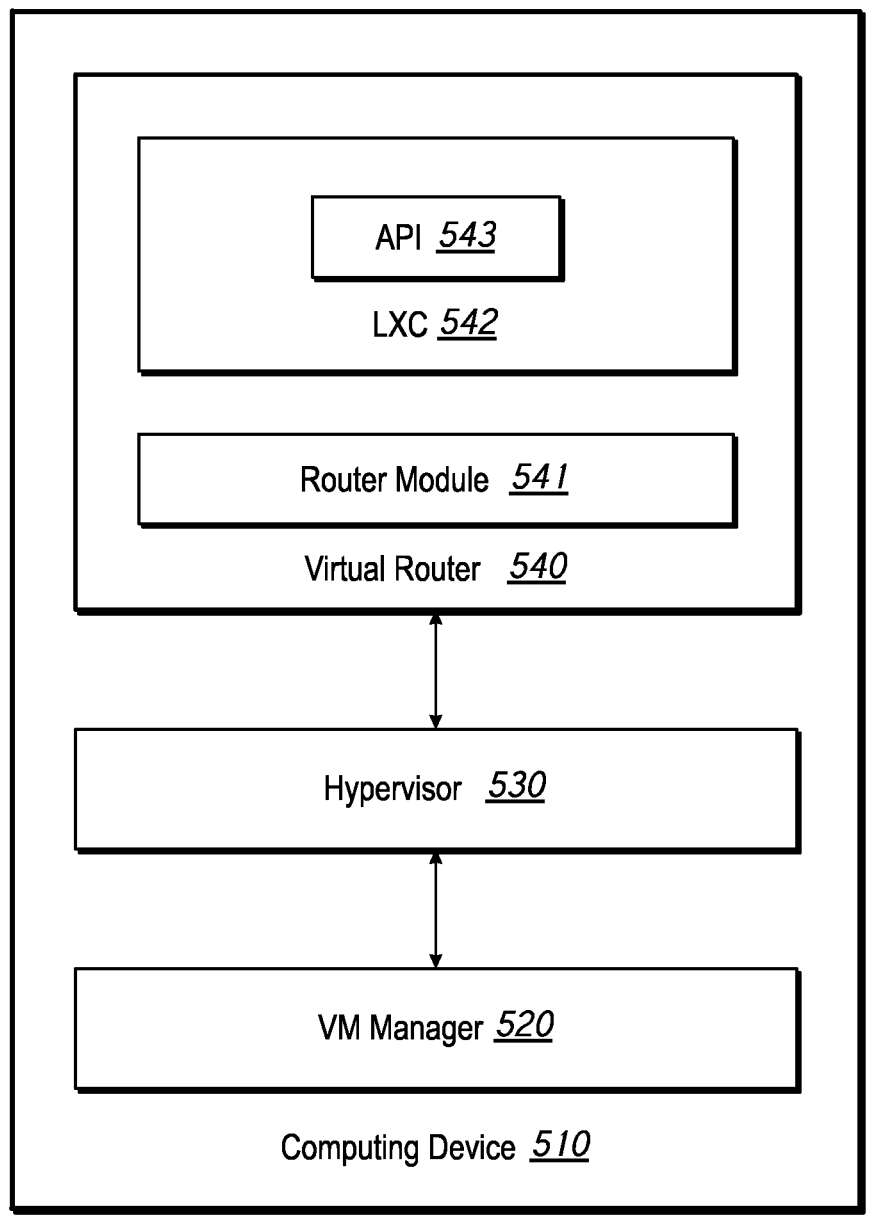
FIG. 5 is a block diagram illustrating a computing device, in accordance with some embodiments.

FIG. 5 is a block diagram illustrating a computing device 510, in accordance with some embodiments. As discussed above, NFV may be used to virtualize routing functions (or other routing functions) such that the routing functions (or other routing functions) may be located within a public cloud. The routing functions (that may generally be performed by a router) may be virtualized into virtual routers, such as virtual router 540 (or virtual routers 120 and 125 illustrated in FIGS. 1-4). Virtualization allows multiplexing of the resources of an underlying computing device to be shared between one or more VMs. The underlying computing device may allocate various amounts of its resources to each of the one or more VMs. Each of the one or more VMs may be able to use the allocated resources to perform various functions (e.g., to perform routing functions). For example, referring to FIG. 5, the virtual router 540 may be a VM that uses the resources of the computing device 510 to perform routing functions (e.g., to route data). The computing device 510 may be a resource (e.g., a computational or infrastructure resource) of the public cloud (e.g., public cloud 110 illustrated in FIGS. 1 through 4).

In one embodiment, the hypervisor 530 may be a software layer that may provide virtualization functions and/or services. The hypervisor 530 may also be referred to as a virtual machine monitor (VMM). The hypervisor 530 may emulate the hardware used by the virtual router 540. This may make the virtualization of the virtual router 540 transparent to a user of the virtual router 540 (e.g., the user may not realize that the virtual router 540 is not a physical/hardware router). The virtual router 540 may operate within the public cloud (as discussed above). In one embodiment, the hypervisor 530 may operate on top of an operating system (not shown in the figures) of the computing device 510. In another embodiment, the hypervisor 530 may be a bare-metal hypervisor that may operate directly on the hardware of the computing device 510. The hypervisor 530 may operate in conjunction with VM manager 520. The VM manager 520 may add, remove, configuration, and/or modify VMs, such as virtual router 540. For example, the VM manager 520 may add a new VM, remove an existing VM, change a VM (e.g., add/remove/replace virtual hardware), and perform other managerial functions. Although FIG. 5 includes one virtual router 540, it shall be understood that in other embodiments, the multiple virtual routers (e.g., virtual machines) may operate on top of the hypervisor 530.

As illustrated in FIG. 5, the virtual router 540 includes a router module 541. In one embodiment, the router module 541 may determine that the virtual router 540 should provide routing functions with high availability (e.g., operate in conjunction with one or more additional virtual routers as discussed above). For example, the router module 541 may receive user input from a network administrator (e.g., a user). In another example, the router module 541 may access configuration data (stored within the virtual router 540 or at another location). The router module 541 may determine whether the virtual router 540 will operate a primary (virtual) router or a secondary/backup (virtual) router. The router module 541 may perform routing functions (e.g., may route data) when the virtual router 540 operates as a primary router. In one embodiment, the router module 541 may establish a data tunnel (e.g., a GRE tunnel) between the virtual router 540 and another virtual router. The router module 541 may determine whether another virtual router (e.g., whether a primary virtual router) is able to route packets when the virtual router 540 operates as a secondary or backup (virtual) router. For example, the router module 541 may periodically transmit messages and may check for responses to the messages (as discussed above). In another example, the router module 541 may periodically check for messages transmitted by the other virtual router (as discussed above). The router module 541 may update a routing table when the other virtual router (e.g., the primary virtual router) is unable to route data (e.g., has failed or become inoperative). The router module 541 may take over or resume routing functions for the other virtual router (as discussed above).

The virtual router 540 may optionally include a Linux container (LXC) 542. LXC 542 may be a virtualization environment that allows the virtual router 540 to operate (e.g., execute or run) applications, programs, operating systems, and/or services within the virtualization environment. The virtualization environment provided by the LXC 542 may isolate the applications, programs, operating systems, and/or services in the LXC 542 from the rest of the virtual router 540. The LXC 542 may allow the virtual router to operate (e.g., execute or run) applications, programs, operating systems, and/or services within the LXC 542 without affecting the operation of the virtual router 540. The LXC 542 may be referred to as a lightweight virtualization environment because the LXC 542 may not emulate physical hardware. As illustrated in FIG. 5, the LXC 542 includes API 543. In one embodiment, the API 543 may be provided by a cloud service provider of the public cloud (as discussed above). The API 543 may allow the router module 541 to update a routing table of the public cloud. For example, the API 543 may be a function call or a remote procedure call (RPC) that allows the router module 541 to update the routing table. Because the LXC 542 may allow the API 543 to operate without affecting the operation of the virtual router 540, different APIs may be included in the LXC 542 to allow the virtual router 540 to operate with different cloud service providers. For example, the virtual router 540 may be used in a first public cloud (operated by a first cloud service provider) and a first API may be included in the LXC 542 to allow the router module 541 to update a first routing table of the first public cloud. The virtual router 540 may be used in a second public cloud (operated by a second cloud service provider) and a second API may be included in the LXC 542 to allow the router module 541 to update a second routing table of the second public cloud.

Although the present disclosure may refer to an LXC, it shall be understood that various other components, constructs, and/or environments may be used to allow the API 543 to operate without affecting the operation of the virtual router 540. For example, the API 543 may be stored in a different partition (e.g., disk partition) of the virtual router 540.

Figure 6:
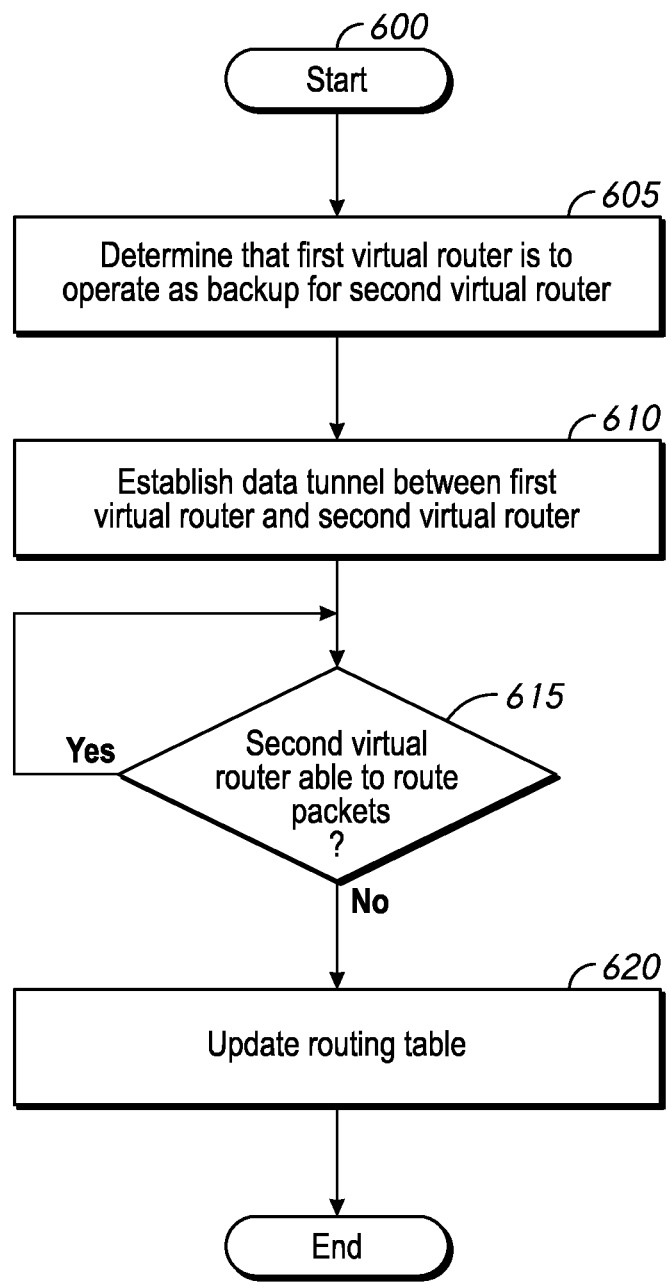
FIG. 6 is a flowchart representation of a method of updating a routing table, in accordance with some embodiments.

FIG. 6 is a flowchart representation of a method 600 of updating a routing table, in accordance with some embodiments. In some implementations, the method 600 may be performed by a routing module and/or a virtual router (e.g., routing module 541 illustrated in FIG. 5 and/or virtual router 125 illustrated in FIGS. 1 through 4). The routing module and/or virtual router may include hardware (e.g., circuitry, dedicated logic, programmable logic, microcode, etc.), software (e.g., instructions run on a processor to perform hardware simulation), firmware, or a combination thereof. Briefly, method 600 includes determining whether a virtual router is able to route packets and updating a routing table when the virtual router is unable to route packets. The method 600 begins at block 605 where the method 600 determines that a first virtual router is configured to operate as a backup router for a second virtual router. For example, the method 600 may determine that the first virtual router is configured to operate as a backup router for a second virtual router based on user input, configuration settings, etc. The first virtual router and the second virtual router may reside within a public cloud (as discussed above).

At block 610, the method 600 establishes a data tunnel between the first virtual router and the second virtual router. For example, the first virtual router may establish the data tunnel to the second virtual router, or vice versa. The data tunnel may be a GRE tunnel, an IPSec tunnel, an SSH tunnel, etc. At block 615, the method 600 may determine whether the second virtual router is able to route packets (e.g., is able to route messages or data), as discussed above. If the second virtual router is able to route packets, the method 600 may proceed to block 615. If the second virtual router is unable to route packets, the method 600 may proceed to block 620, where the method 600 may update a routing table of the public cloud to indicate that the first virtual router should be used to route data (instead of the second virtual router) because the second virtual router is unable to route packets (e.g., the second virtual router is inoperative). For example, the method 600 may access one or more APIs stored within an LXC of the first virtual router (as discussed above). In another example, the method 600 may transmit a request to another computing device to update the routing table (as discussed above).

FIG. 7 is a flowchart representation of a method 700 of determining whether a virtual router is able to route packets (e.g., whether a virtual router has failed or is inoperative), in accordance with some embodiments. In some implementations, the method 700 may be performed by a routing module and/or a virtual router (e.g., routing module 541 illustrated in FIG. 5 and/or virtual router 125 illustrated in FIGS. 1 through 4). The routing module and/or virtual router may include hardware (e.g., circuitry, dedicated logic, programmable logic, microcode, etc.), software (e.g., instructions run on a processor to perform hardware simulation), firmware, or a combination thereof. Briefly, method 700 includes transmitting a message and determining whether a response is received. The method 700 begins at block 705 where the method 700 transmit a message (or a packet) to a virtual router via a data tunnel. The method 700 may determine whether a response to the message was received from the virtual router (via the data tunnel) within a threshold period of time (e.g., a few milliseconds, a few seconds, etc.) at block 710. If a response is received within the threshold period of time, the method 700 may wait for a period of time (e.g., a few milliseconds, a few seconds, etc.) at block 710 and may proceed to block 705 after waiting for the period of time. If a response is not received within the threshold period of time, the method 700 may determine that the virtual router is unable to route packets at block 720 (as discussed above).

FIG. 8 is a flowchart representation of a method 800 of determining whether a virtual router is able to route packets (e.g., whether a virtual router has failed or is inoperative), in accordance with some embodiments. In some implementations, the method 800 may be performed by a routing module and/or a virtual router (e.g., routing module 541 illustrated in FIG. 5 and/or virtual router 125 illustrated in FIGS. 1 through 4). The virtual router and/or router module may include hardware (e.g., circuitry, dedicated logic, programmable logic, microcode, etc.), software (e.g., instructions run on a processor to perform hardware simulation), firmware, or a combination thereof. Briefly, method 800 includes determining whether a message is received from the virtual router. As discussed above, the virtual router may periodically transmit messages (or packets) to indicate that the virtual router is able to route packets. The method 800 begins at block 805 where the method 800 determines whether a message is received from the virtual router within a threshold period of time (e.g., milliseconds, seconds, etc.). If a message is received within the threshold period of time, the method may wait for a period of time at block 810 and may proceed to block 805 after waiting for the period of time. If a message is not received within the threshold period of time, the method 800 may determine that the virtual router is unable to route packets at block 815 (as discussed above).

Figure 9:
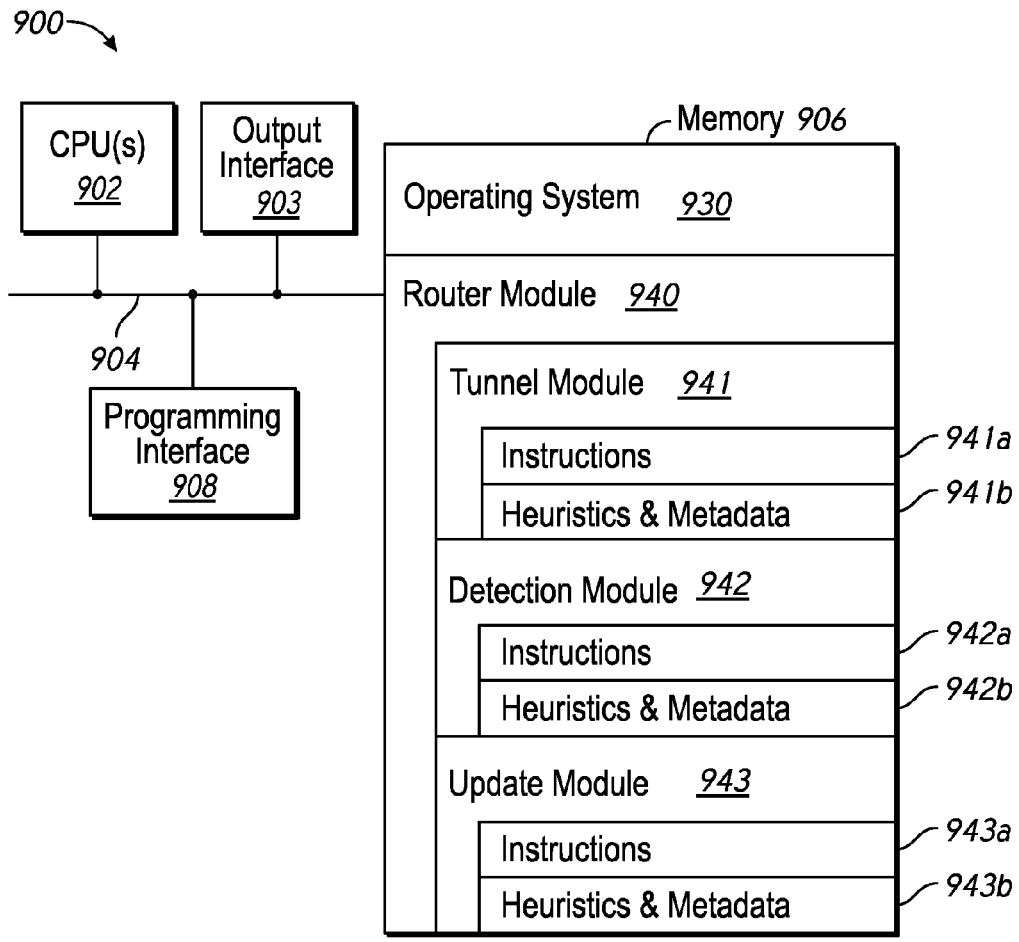
FIG. 9 is a block diagram of a computing device, in accordance with some embodiments.

FIG. 9 is a block diagram of a computing device 900, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPU's) 902 (e.g., processors), one or more output interfaces 903, a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930 and a router module 940. In some embodiment, one or more instructions are included in a combination of logic and non-transitory memory. The operating system 930 includes procedures for handling various basic system services and for performing hardware dependent tasks. In some embodiments, the router module 940 may be configured to determine that a first virtual router is to operate as a backup router for a second virtual router, establish a data tunnel, determine whether the second virtual router is able to route packets, and update a routing table. To that end, the router module 940 includes a tunnel module 941, a detection module 942, and an update module 943. The router module 940, the tunnel module 941, the detection module 942, and the update module 943 may each be processing logic that comprises hardware (e.g., circuitry, dedicated logic, programmable logic, microcode, etc.), software (e.g., instructions run on a processor to perform hardware simulation), firmware, or a combination thereof.

In some embodiments, the tunnel module 941 may establish the data tunnel between the first virtual router and the second virtual router. To that end, the tunnel module 941 includes a set of instructions 941*a* and heuristics and metadata 941*b*. In some embodiments, the detection module 942 may determine whether the second virtual router is able to route packets. To that end, the detection module 942 includes a set of instructions 942*a* and heuristics and metadata 942*b*. In some embodiments, the update module 943 may update the routing table. To that end, the update module 943 includes a set of instructions 943*a* and heuristics and metadata 943*b*.

Although router module 940, the tunnel module 941, the detection module 942, and the update module 943 are illustrated as residing on a single computing device 900, it should be understood that in other embodiments, any combination of router module 940, the tunnel module 941, the detection module 942, and the update module 943 may reside on separate computing devices.

Moreover, FIG. 9 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   determining that a first virtual router is configured to operate as a backup router for a second virtual router, wherein the first virtual router and the second virtual router reside within a public cloud;
   establishing a tunnel between the first virtual router and the second virtual router;
   transmitting, by the first virtual router, a message to the second virtual router over the tunnel;
   determining, by the first virtual router, whether the second virtual router transmitted a response to the message over the tunnel;
   in response to determining that the second virtual router did not transmit a response to the message, determining, by the first virtual router, that the second virtual router is unable to route packets; and
   in response to determining that the second virtual router is unable to route packets, transmitting, by the first virtual router to a computing device within the public cloud, a request to update a routing table of the public cloud to allow the first virtual router to route the packets that the second virtual router is unable to route.

2. The method of claim 1, wherein transmitting the request to update the routing table comprises:
   accessing one or more application programming interfaces (APIs) stored within a Linux container (LXC) of the first virtual router; and
   transmitting the request to update the routing table using the one or more APIs.

3. The method of claim 1, wherein the data tunnel comprises a general routing encapsulation (GRE) tunnel.

4. The method of claim 1, wherein the first virtual router comprises a first virtual machine (VM) and the second virtual router comprises a second VM.

5. The method of claim 1, wherein the first virtual router and the second virtual router are unable to perform layer 2 discovery within the public cloud.

6. An apparatus comprising:
   one or more processors; and
   a memory comprising instructions that when executed cause the one or more processors to perform operations comprising:
      determining that a first virtual router is configured to operate as a backup router for a second virtual router, wherein the first virtual router and the second virtual router reside within a public cloud;
      establishing a tunnel between the first virtual router and the second virtual router;
      transmitting, by the first virtual router, a message to the second virtual router over the tunnel;
      determining, by the first virtual router, whether the second virtual router transmitted a response to the message over the tunnel;
      in response to determining that the second virtual router did not transmit a response to the message, determining that the second virtual router is unable to route packets; and
      in response to determining that the second virtual router is unable to route packets, transmitting, to a computing device in the public cloud, a request to update a routing table of the public cloud to allow the first virtual router to route the packets that the second virtual router is unable to route.

7. The apparatus of claim 6, wherein transmitting the request to update the routing table comprises:
   accessing one or more application programming interfaces (APIs) stored within a Linux container (LXC) of the first virtual router; and
   transmitting the request to update the routing table using the one or more APIs.

8. The apparatus of claim 6, wherein the first virtual router comprises a first virtual machine (VM) and the second virtual router comprises a second VM.

9. The apparatus of claim 6, wherein the data tunnel comprises a general routing encapsulation (GRE) tunnel.

10. The apparatus of claim 6, wherein the first virtual router and the second virtual router are unable to perform layer 2 discovery within the public cloud.

11. The apparatus of claim 6, wherein the apparatus further comprises the first virtual router.

12. A non-transitory computer readable storage medium comprising instructions that, when executed by one or more processors, cause the one or more processors to perform operations comprising:
   determining that a first virtual router is configured to operate as a backup router for a second virtual router, wherein the first virtual router and the second virtual router reside within a public cloud;
   establishing a tunnel between the first virtual router and the second virtual router;
   transmitting, by the first virtual router, a message to the second virtual router over the tunnel;
   determining, by the first virtual router, whether the second virtual router transmitted a response to the message over the tunnel;
   in response to determining that the second virtual router did not transmit a response to the message, determining that the second virtual router is unable to route packets; and
   in response to determining that the second virtual router is unable to route packets, transmitting, to a computing device within the public cloud, a request to update a routing table of the public cloud to allow the first virtual router to route the packets that the second virtual router is unable to route.

* * * * *